United States Patent
Sakakibara et al.

(10) Patent No.: US 9,910,313 B2
(45) Date of Patent: Mar. 6, 2018

(54) LIQUID CRYSTAL DISPLAY DEVICE AND MANUFACTURING METHOD THEREOF

(71) Applicant: Panasonic Liquid Crystal Display Co., Ltd., Hyogo (JP)

(72) Inventors: Tatsuhito Sakakibara, Hyogo (JP); Daisuke Kajita, Hyogo (JP); Daisuke Fuse, Hyogo (JP); Ryutaro Oke, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 15/448,608

(22) Filed: Mar. 3, 2017

(65) Prior Publication Data
US 2017/0255052 A1    Sep. 7, 2017

(30) Foreign Application Priority Data

Mar. 4, 2016    (JP) .................................. 2016-042465

(51) Int. Cl.
| | |
|---|---|
| G02F 1/1335 | (2006.01) |
| G02F 1/1333 | (2006.01) |
| G02F 1/1343 | (2006.01) |
| G02F 1/1362 | (2006.01) |
| G02F 1/1368 | (2006.01) |

(52) U.S. Cl.
CPC ...... *G02F 1/133512* (2013.01); *G02F 1/1368* (2013.01); *G02F 1/133345* (2013.01); *G02F 1/133514* (2013.01); *G02F 1/133516* (2013.01); *G02F 1/134309* (2013.01); *G02F 1/136286* (2013.01); *G02F 2201/121* (2013.01); *G02F 2201/123* (2013.01); *G02F 2202/023* (2013.01); *G02F 2202/28* (2013.01)

(58) Field of Classification Search
CPC ............... G02F 2001/134372; G02F 1/133345
See application file for complete search history.

(56) References Cited

U.S. PATENT DOCUMENTS

2015/0346548 A1* 12/2015 Kubota ............ G02F 1/133371
349/113

FOREIGN PATENT DOCUMENTS

JP    H11-72801 A    3/1999

\* cited by examiner

*Primary Examiner* — Phu Vu
(74) *Attorney, Agent, or Firm* — HEA Law PLLC

(57) ABSTRACT

A liquid crystal display device includes a first substrate and a second substrate disposed in opposition. The first substrate includes gate lines, data lines, pixel electrodes, and an insulating film being superimposed, in plan view, over the gate lines, the data lines, and the pixel electrodes. The second substrate includes a first colored portion transmitting light of a first color, a second colored portion transmitting light of a second color, and a light-shielding portion disposed in a boundary area between the first colored portion and the second colored portion, for blocking transmittance of light of the first color and light of the second color. The insulating film includes a first portion overlapping, in plan view, the first colored portion or the second colored portion, and a second portion overlapping, in plan view, the light-shielding portion and being of thicker film thickness than the first portion.

11 Claims, 14 Drawing Sheets

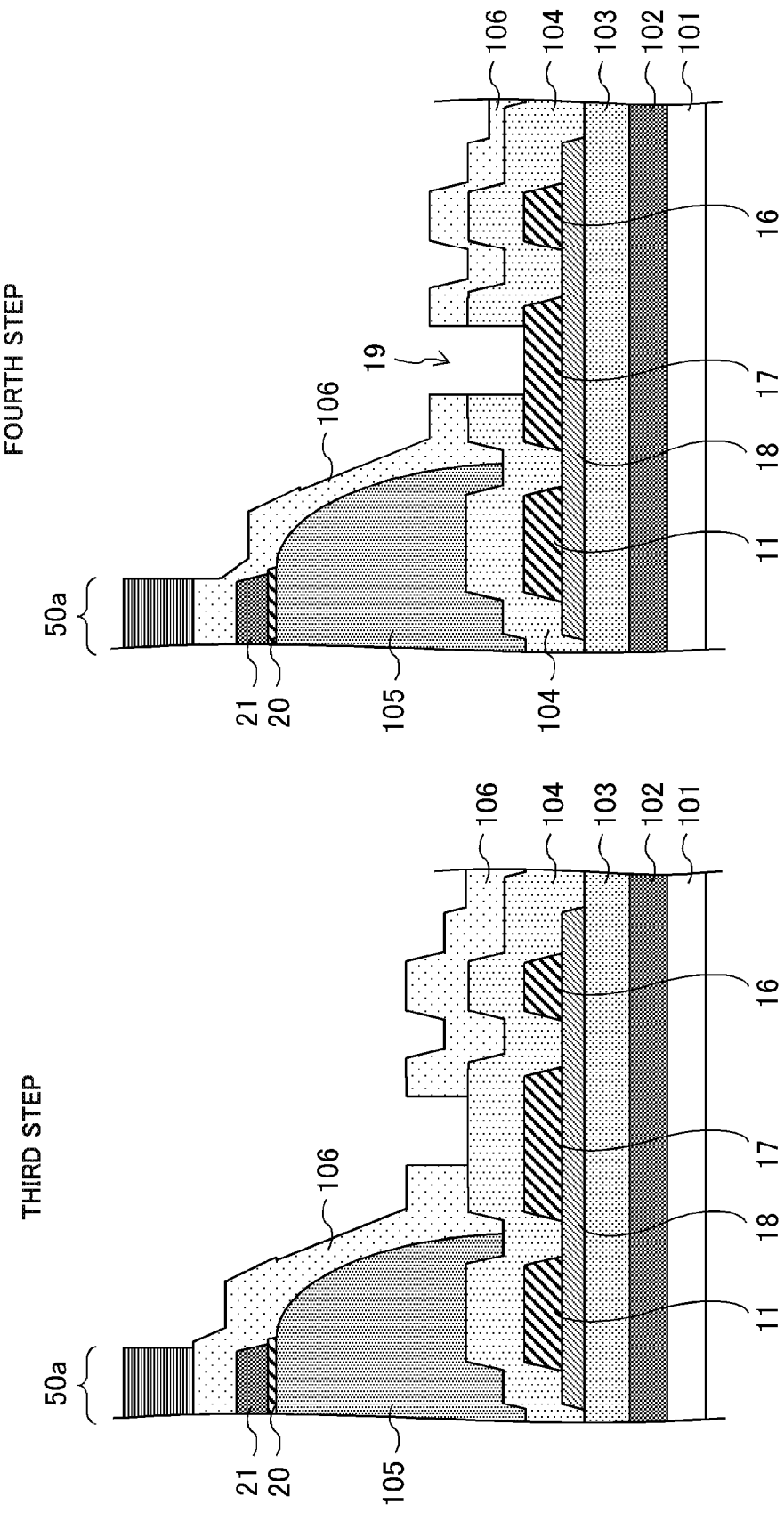

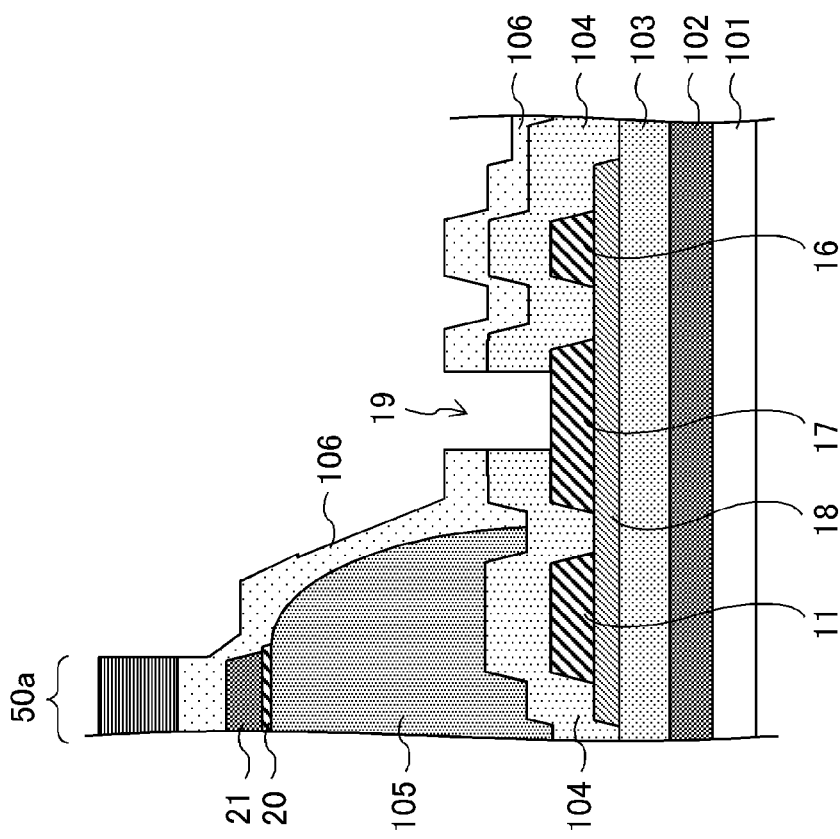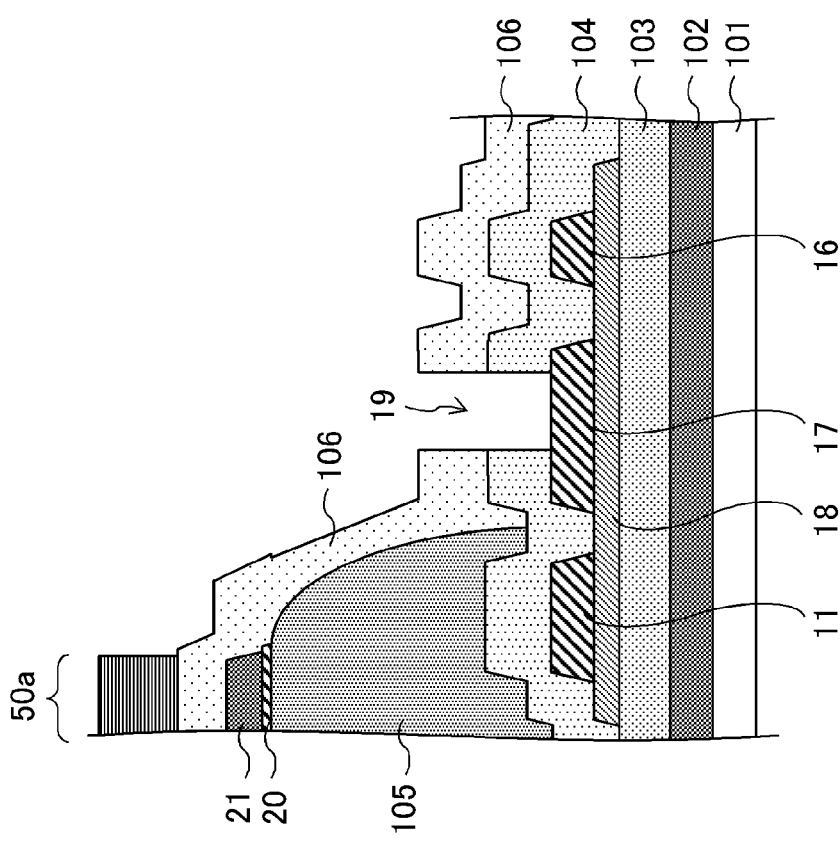

FIFTH STEP

LIQUID CRYSTAL DISPLAY DEVICE AND MANUFACTURING METHOD THEREOF

CROSS-REFERENCE TO RELATED APPLICATION

The present application claims priority from Japanese application JP2016-042465 filed on Mar. 4, 2016, the content of which is hereby incorporated by reference into this application.

TECHNICAL FIELD

The present disclosure relates to a liquid crystal display device and a method of manufacturing the liquid crystal display device.

BACKGROUND

Liquid crystal display devices include a thin film transistor substrate (hereinafter referred to as a TFT substrate), a color filter substrate facing the TFT substrate (hereinafter referred to as a CF substrate), and a liquid crystal layer sandwiched between the TFT substrate and the CF substrate. In the CF substrate, colored portions for transmitting light of different colors (for example, red, green, and blue) and light shielding sections (hereinafter referred to as a black matrix) arranged in a boundary between the respective colored portions are formed. A known problem with conventional liquid crystal display devices is that color mixing occurs due to light leakage from adjacent pixel regions. The color mixing is caused, for example, by positional deviation or the like when the TFT substrate and the CF substrate are glued together. The color mixing is noticeably observed particularly when the viewing direction is oblique, which may degrade the display quality. For example, when a red image is displayed and the red pixels are viewed from an oblique direction, the red pixels display a color mixed with green or blue.

Technology for reducing color mixing is disclosed in the prior art. In a prior-art liquid crystal display device, regions where amount of misalignment when the TFT substrate and the CF substrate are glued together has been taken into consideration, and regions where light shielding when the display screen is viewed from an oblique direction has been taken into consideration are added to regions for forming the black matrix (See Japanese unexamined published patent application No. H11-72801).

However, in the prior-art technology, owing to enlarged width of the black matrix, a problem of the aperture ratio of the pixels decreasing has arisen.

SUMMARY

The present disclosure has been made in view of the above problems, and an object thereof is to provide a liquid crystal display device and a method of manufacturing the liquid crystal display device that can control to a minimum deterioration in display quality due to color mixing, with little decreasing of the aperture ratio of the pixels.

In one general aspect, the instant application describes a liquid crystal display device includes a first substrate and a second substrate disposed in opposition. The first substrate includes gate lines, data lines, pixel electrodes, and an insulating film being superimposed, in plan view, over the gate lines, the data lines, and the pixel electrodes. The second substrate includes a first colored portion transmitting light of a first color, a second colored portion transmitting light of a second color, and a light-shielding portion disposed in a boundary area between the first colored portion and the second colored portion, for blocking transmittance of light of the first color and light of the second color. The insulating film includes a first portion overlapping, in plan view, the first colored portion or the second colored portion, and a second portion overlapping, in plan view, the light-shielding portion and being of thicker film thickness than the first portion.

The above general aspect may include one or more of the following features.

The insulating film may be an organic insulating film.

The first substrate may further include a common electrode. The insulating film may be disposed between the common electrode and the plurality of pixel electrodes.

In another general aspect, a method of manufacturing a liquid crystal display device. The including a first substrate including a plurality of gate lines, a plurality of data lines, a plurality of pixel electrodes, and an organic insulating film, made of an organic material, being superimposed, in plan view, over the plurality of gate lines, the plurality of data lines, and the plurality of pixel electrodes, and a second substrate including a first colored portion transmitting light of a first color, a second colored portion transmitting light of a second color, and a light-shielding portion disposed in a boundary area between the first colored portion and the second colored portion, for blocking transmittance of light of the first color and light of the second color. The liquid-crystal display device manufacturing method includes a process of forming the organic insulating film. The process of forming the organic insulating film includes a step of forming an organic layer by coating an organic photosensitive material onto the first substrate, and a step of irradiating the organic layer with light beams of differing amount of light onto a first portion of the organic layer overlapping, in plan view, the first colored portion or the second colored portion, and onto a second portion of the organic layer overlapping, in plan view, the light-shielding portion. In the step of forming the organic insulating film, the second portion is formed to be of thicker layer thickness than the first portion.

The liquid crystal display device may further comprise a thin film transistor. A third portion of the organic layer is superimposed, in plan view, over the thin film transistor. In the step of irradiating the organic layer with light beams, the third portion is irradiated with a light beam of amount of light different from that of the first portion and the second portion, to remove the third portion of the organic layer.

The organic photosensitive material may be a positive-type photosensitive synthetic resin. In the step of irradiating the organic film with light beams, the amount of light that the first portion is irradiated with may be greater compared with the amount of light that the second portion is.

In the step of irradiating the organic film with light beams, the amount of light that the third portion of the organic film being superimposed, in plan view, over the thin film transistor is irradiated with may be greater compared with the amount of light that the first portion is.

In another general aspect, a method of manufacturing a liquid crystal display device. The liquid crystal display device includes a first substrate including a plurality of gate lines, a plurality of data lines, a plurality of pixel electrodes, and an inorganic insulating film, made of an inorganic material, being superimposed, in plan view, over the plurality of gate lines, the plurality of data lines, and the plurality of pixel electrodes, and a second substrate including a first colored portion transmitting light of a first color, a second colored portion transmitting light of a second color, and a light-shielding portion disposed in a boundary area between the first colored portion and the second colored portion, for blocking transmittance of light of the first color and light of the second color. The liquid-crystal display device manufacturing method comprises a process of forming the inorganic insulating film. The process includes a step of forming an inorganic layer onto the first substrate, a step of forming a resist layer by coating an organic photosensitive material onto the inorganic layer, a step of irradiating the inorganic layer with light beams of differing amount of light onto a first region of the resist layer overlapping, in plan view, the first colored portion or the second colored portion, and onto a second region of the resist overlapping, in plan view, the light-shielding portion, a first resist removing step of removing the first region of the resist layer and leaving the second region of the resist layer; a first etching step of etching portions of a first part of the inorganic layer overlapping the first region in plan view; and a second resist removing step of removing the second region of the resist layer. In the step of forming the inorganic layer, a second part of the inorganic layer overlapping the second region in plan view is formed to be of thicker film thickness than the first part of the inorganic layer.

The first substrate may further include a thin film transistor. In the step of irradiating the inorganic layer with light beams, a third region of the inorganic layer overlapping at least a part of the thin film transistor in plan view may be irradiated with a light beam of amount of light different from that of the first region and the second region of the inorganic layer, to remove the resist layer. The manufacturing method further comprises a second etching step of removing, by etching, a third part of the inorganic layer overlapping the third region in plan view.

The organic photosensitive material may be a positive-type photosensitive synthetic resin. In the step of irradiating the inorganic layer with light beams, the amount of light that the first region is irradiated with may be greater compared with the amount of light that the second region is.

In the step of irradiating the inorganic film with light beams, the amount of light that the third region overlapping at least a part of the thin film transistor in plan view may be irradiated with is greater compared with the amount of light that the first part is.

In the configuration of the liquid crystal display device and the manufacturing method of the liquid crystal display device of the present disclosure, the liquid crystal display device is able to reduce deterioration in display quality due to color mixing, with little decreasing of the aperture ratio of the pixels.

BRIEF DESCRIPTION OF DRAWINGS

FIGS. 9A and 9B are diagrams showing a part of a process of manufacturing the upper insulating film in the liquid crystal display device according to the present embodiment;

FIGS. 13A and 13B are diagrams showing a part of a process of manufacturing the upper insulating film in the liquid crystal display device according to the present embodiment.

DETAILED DESCRIPTION OF THE PREFERRED EMBODIMENTS

Embodiments of the present disclosure will be described below with reference to the drawings.

Figure 1:
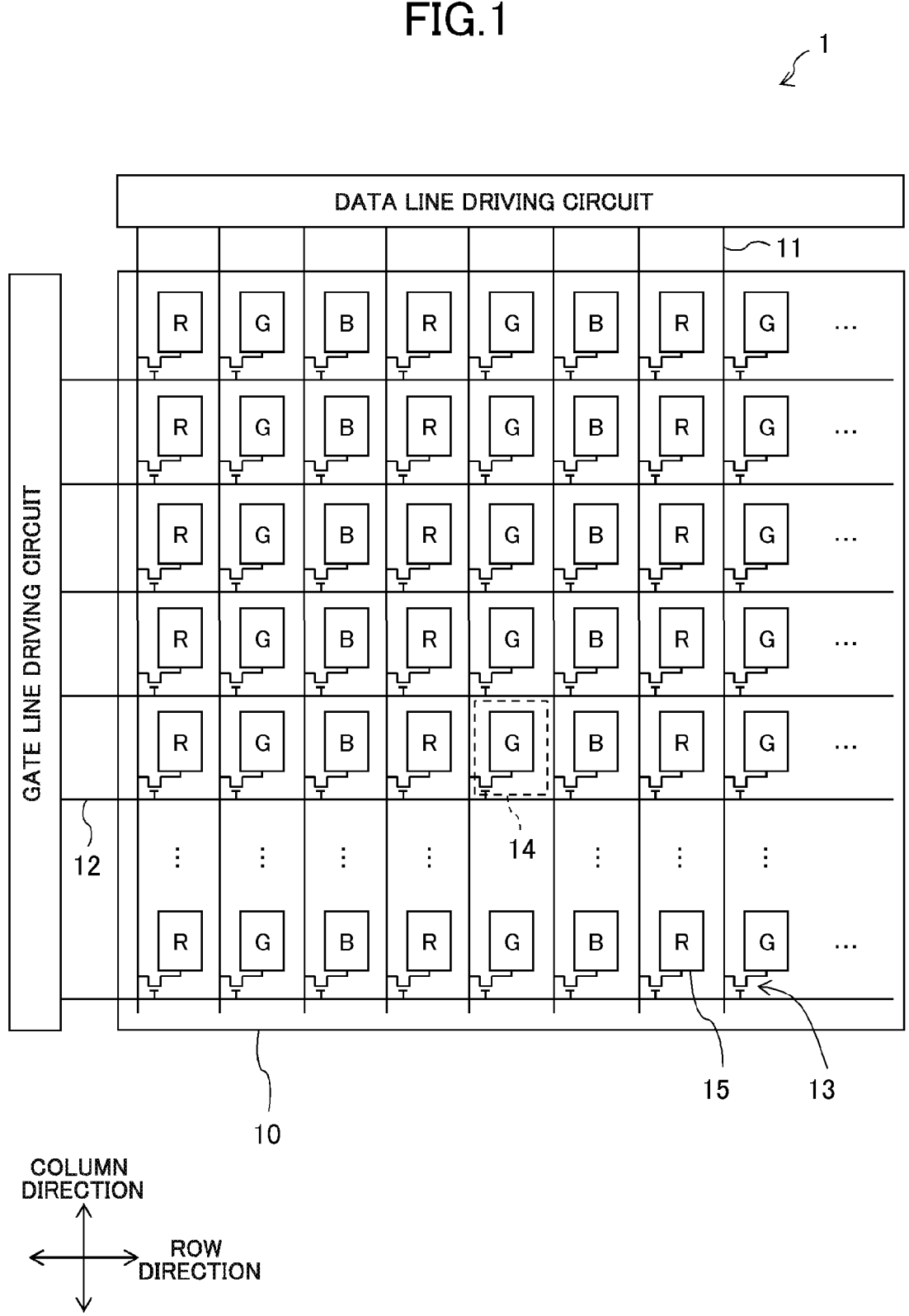
FIG. 1 is a plan view showing a schematic configuration of a liquid crystal display device according to a present embodiment.

FIG. 1 is a plan view showing an overall configuration of the liquid crystal display device according to the present embodiment. The liquid crystal display device 1 includes a display panel 10 for displaying images, drive circuits (a data line driving circuit and a gate-line driving circuit) for driving the display panel 10, a control circuit (not shown) for controlling the drive circuits, and a backlight (not shown) for illuminating the display panel 10 from the back side. The driving circuits may be mounted on the display panel 10.

Figure 2:
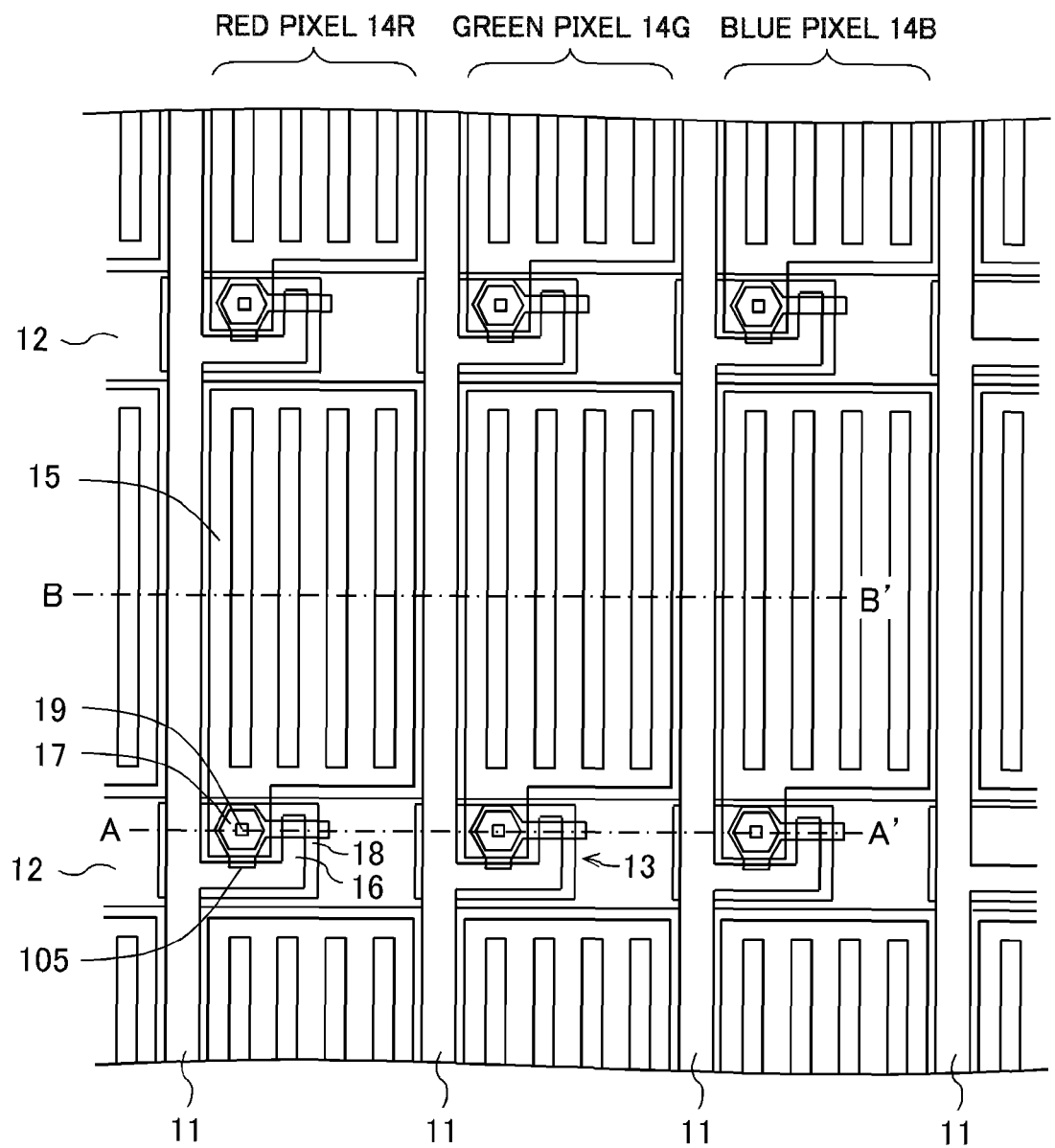
FIG. 2 is a plan view showing a configuration of a part of the display panel according to the present embodiment.
Figure 3:
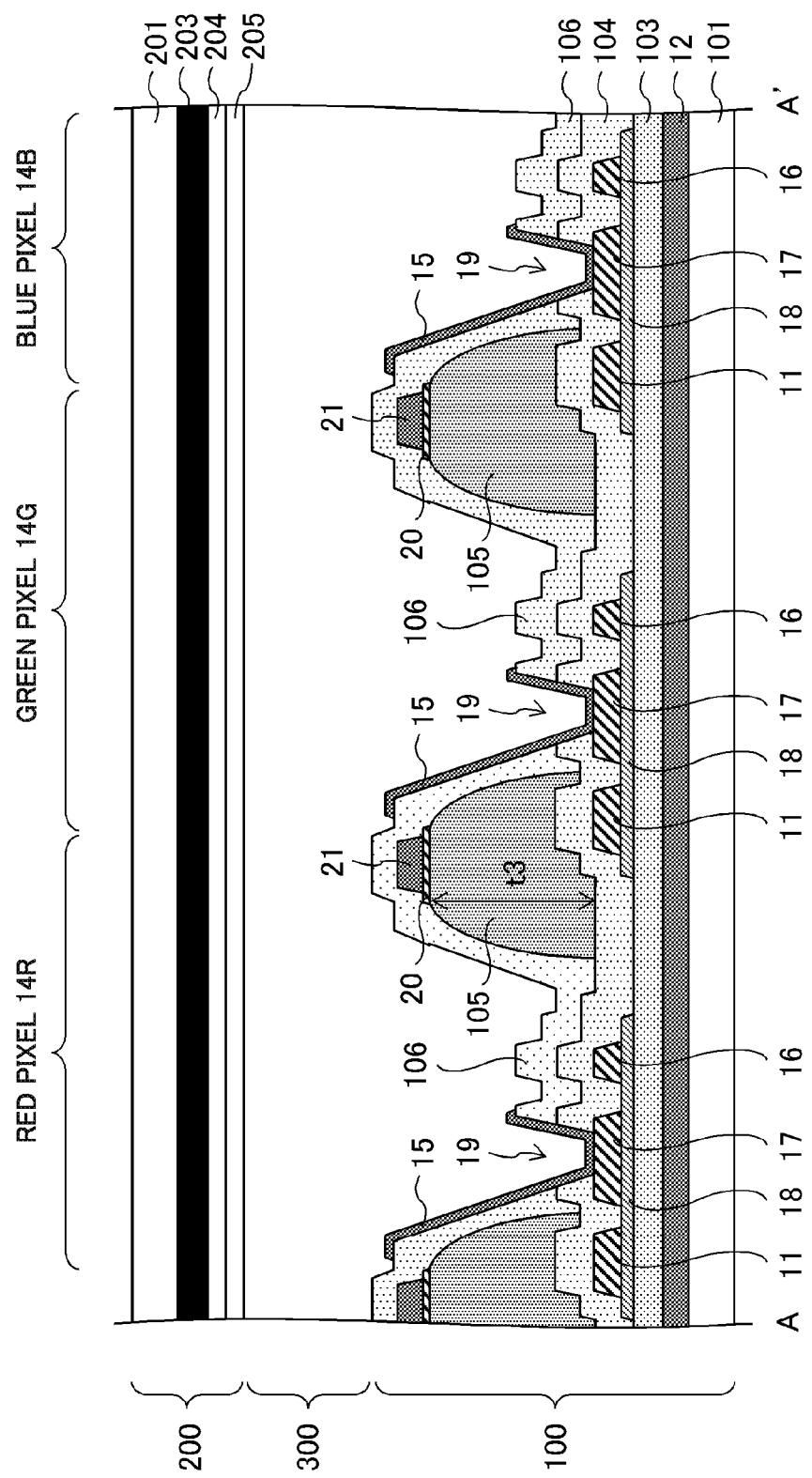
FIG. 3 is a cross sectional view taken along line A-A' in FIG. 2.
Figure 4:
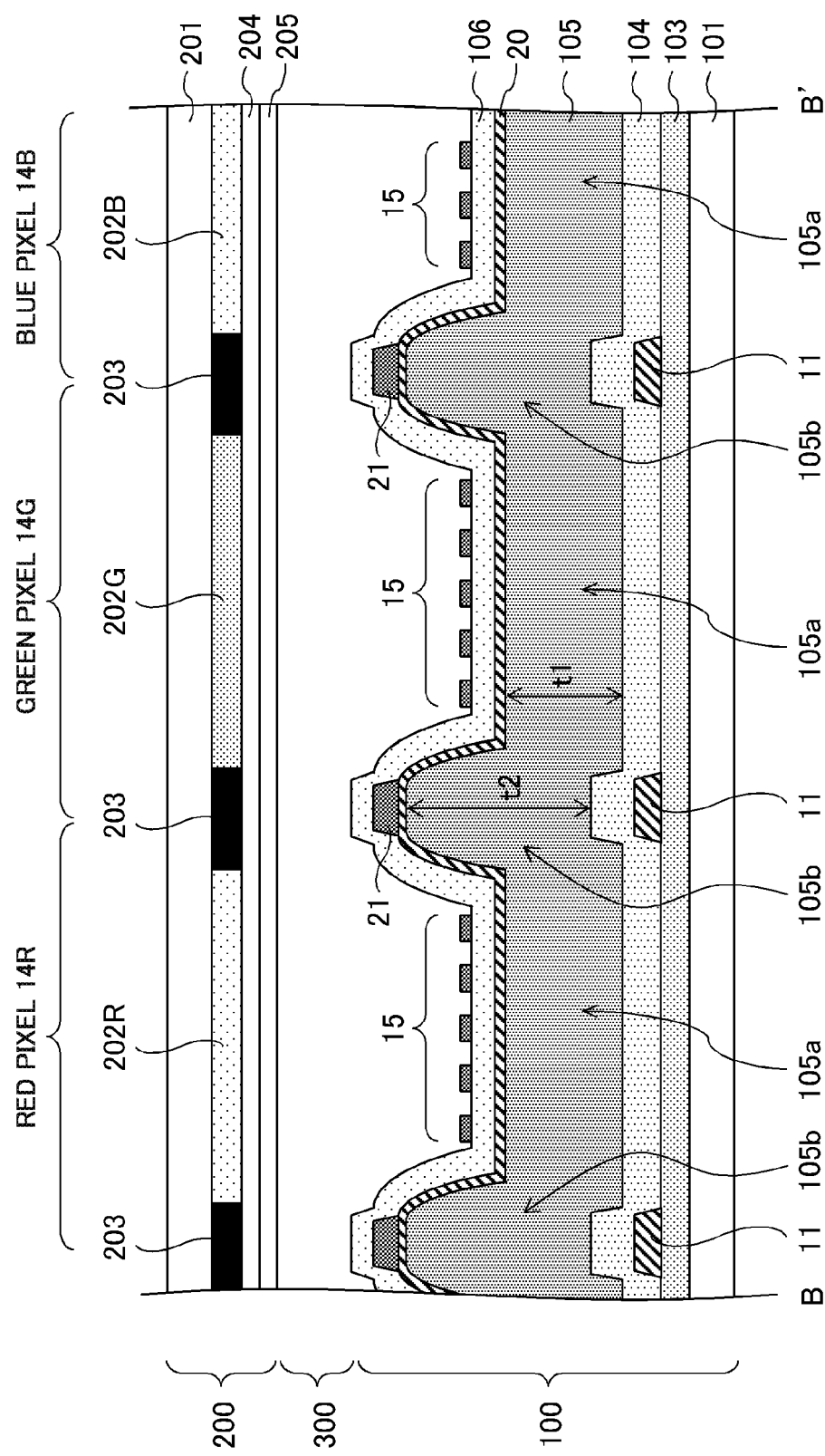
FIG. 4 is a cross-sectional view taken along line B-B' in FIG. 2.

FIG. 2 is a plan view showing a configuration of a part of the display panel 10. FIG. 3 is a cross-sectional view taken along line A-A' in FIG. 2, and FIG. 4 is a sectional view taken along line B-B' in FIG. 2. As shown in FIG. 3, the display panel includes a thin film transistor substrate (hereinafter referred to as a TFT substrate) 100 disposed on the back side, a color filter substrate (hereinafter referred to as a CF substrate) 200 opposing the TFT substrate 100 and disposed on the front side (display surface-side), and a liquid crystal layer 300 sandwiched between the TFT substrate 100 and the CF substrate 200. FIG. 2 is a perspective view of CF substrate 200 taken from the front side of the TFT substrate 100.

As shown in FIG. 1 and FIG. 2, in the TFT substrate 100, a plurality of data lines 11 extending in the column direction, a plurality of gate lines 12 extending in the row direction, and thin film transistors (hereinafter referred to as TFTs) 13 near the respective intersections of the plurality of data lines 11 and the plurality of gate lines 12 are formed, and a rectangular region surrounded by two adjacent data lines 11 and two adjacent gate lines 12 is defined as one pixel 14, and a plurality of the pixels 14 are arranged in a matrix manner (row and column directions). A pixel electrode 15 is provided in each pixel 14. In the TFT substrate 100, a common electrode 20 that is common to the respective pixels 14 (shown in FIGS. 3 and 4) is provided. As shown in FIG. 2, each pixel electrode 15 has openings (slits), which are stripe-shaped. The TFTs 13 include a semiconductor layer 18 made of amorphous silicon (a-Si) formed on a gate insulating film 103 (shown in FIGS. 3 and 4), and a drain electrode 16 and a source electrode 17 formed on the semiconductor layer 18. The drain electrode 16 is electrically connected to a data line 11. The source electrode 17 and the pixel electrode 15 are electrically connected to each other through a contact hole 19. An organic insulation film 105 is formed on the TFT substrate 100, and as shown in FIG. 2, the organic insulating film 105 in plan view is opened in the vicinity of the source electrode 17.

A data signal (gradation voltage) is supplied from the data line driving circuit to each data line 11, and a gate signal (gate voltage) is supplied from the gate-line driving circuit to each gate line 12. A common voltage Vcom is supplied through common wiring 21 (shown in FIGS. 3 and 4) to the common electrode 20. When ON voltage of the gate signal (gate-on voltage) is supplied to the gate line 12, the TFT 13 connected to the gate line 12 is turned on, and via the data line 11 that is connected to the TFT 13, the data voltage is supplied to the pixel electrodes 15. An electric field is generated by a difference between the data voltage supplied to the pixel electrodes 15 and the common voltage Vcom supplied to the common electrode 20. This electric field drives the liquid crystal and controls transmittance of light from the backlight so as to display an image. In order to realize a color display, a data voltage is supplied to each data line 11 connected to the pixel electrodes 15 of the pixels 14 corresponding respectively to red, green, and blue formed in stripe-shaped colored portions.

As shown in FIG. 3 and FIG. 4, in the CF substrate 200, a plurality of colored portions 202 are formed corresponding to each pixel 14. Each colored portion 202 is surrounded by a black matrix 203 for shielding light from transmitting, and is formed in a rectangular shape, for example. Further, the plurality of colored portions 202 includes red colored portions 202R made of a red (R-color) material that transmits red light, green colored portions 202G made of a green (G-color) material that transmits green light, and blue colored portions 202B made of a blue (B-color) material that transmits blue light. The red colored portions 202R, green colored portions 202G, and blue colored portions 202B are iteratively arrayed in that order along the row direction. Colored portions 202 of the same color are arrayed along the column direction. The black matrix 203 is formed in the boundary areas between colored portions 202 adjoining along the row and column direction.

As shown in FIGS. 1 and 2, the plurality of pixels 14 include red pixels 14R corresponding to the red colored portions 202R, green pixels 14G corresponding to the green colored portions 202G, and blue pixels 14B corresponding to the blue colored portions 202b. These pixels 14 are arranged to correspond to the arrangement of the colored portions 202, in that a red pixel 14R, a green pixel 14G, and a blue pixel 14B are iteratively arrayed in that order along the row direction, and pixels 14 having the same color are arrayed along the column direction.

Next, with reference to FIGS. 3 and 4, a cross-sectional structure of the pixels 14 will be described in detail. FIG. 3 shows a cross-sectional view of a region including a TFT in FIG. 2, taken along the row direction, and FIG. 4 shows a sectional view of an opening region of the pixel 14 in FIG. 2, taken along the row direction.

Referring to FIG. 3, in the TFT substrate 100, the gate lines 12 are formed on a glass substrate 101. The gate lines 12 are made of aluminum (Al), molybdenum (Mo), titanium (Ti), or a metal material having copper (Cu) as a main component, or of a plurality of laminated layers of these metal materials, or of an alloy in which tungsten (W), manganese (Mn), titanium (Ti) or the like is added to the above metal materials, or of stacked metal layers of any combination of the above.

The gate insulating film 103 is formed covering the gate lines 12. As a material of the gate insulating film 103, a silicon nitride (SiN) can be used. The semiconductor layer 18 is formed on the gate insulating film 103. On the semiconductor layer 18, the data lines 11, and the drain electrodes 16 and the source electrodes 17 constituting the TFTs 13 are formed. The drain electrodes 16 are electrically connected to the data lines 11.

An interlayer insulating film 104 is formed covering the data lines 11, and the drain electrodes 16 and the source electrodes 17. As a material of the interlayer insulating film 104, a silicon nitride (SiN) or silicon dioxide ($SiO_2$) film can be used.

On the interlayer insulating film 104, an organic insulating film 105 is formed. As the material of the organic insulating film 105, an organic material such as a photosensitive acrylic resin as its main component can be used. The organic material has a relative permittivity of, for example, 4 or less, which is lower than the 6.7 relative permittivity of silicon nitride (SiN). In the manufacturing process, the organic material can be formed thicker than the silicon nitride (SiN). The thickness of the organic insulating film 105 is set at, for example, from 1.5 to 3 μm. Because the relative permittivity is low, and the film thickness can be thick, wiring capacitance that forms between the common electrode 20 disposed on the organic insulating film 105, and the data lines 11 or gate lines 12 disposed under the organic insulating film 105 can be greatly reduced.

The common electrode 20 is formed on the organic insulating film 105. The common electrode 20 is made of an ITO transparent electrode material. Indium tin oxide or indium zinc oxide, for example, may be used for the common electrode 20. The area of each pixel 14 excepting the region in which the TFT is formed is covered with the common electrode 20. That is, the common electrode 20 covering the data lines 11 function as shield electrodes. It is thereby possible to prevent electric field noise emitted from the data lines 11 from entering the liquid crystal layer 300. On the common electrode 20, the common wiring 21 that supplies a common voltage Vcom to the common electrode 20 is formed. The common wiring 21, as seen in plan view, is formed so as to extend in the column direction so as to overlap at least part of the data lines 11.

An upper layer insulating film 106 is formed covering the common electrode 20 and the common wiring 21. A silicon nitride (SiN) can be used for the upper layer insulating film 106. The pixel electrodes 15 are formed on the upper layer insulating film 106. The pixel electrodes 15 are made of an ITO transparent electrode material. The pixel electrodes 15 are electrically connected to the source electrodes 17 through the contact holes 19 formed in the interlayer insulating film 104, and the upper layer insulating film 106. Although not shown, an alignment film is formed so as to cover the pixel electrodes 15, and a polarizing plate is formed on the outer side of the glass substrate 101.

In the CF substrate 200, the colored portions 202 (see FIG. 4) and the black matrix 203 are formed on the glass substrate 201. The colored portions 202 are formed by, for example, colored layers of red, green and blue pigment-dispersion photoresists, and the black matrix 203 is formed either of an organic polymer material utilizing a black pigment, or of a metal material. The overcoat film 204 is formed covering the colored portions 202 and the black matrix 203, and an alignment film 205 is formed on the overcoat film 204. Although not shown, the polarizing plate is formed on the outer side of the glass substrate 201.

As shown in FIG. 4, in a plan view of the display panel 10, the organic insulating film 105 includes first portions 105a that overlap the colored portions 202 (openings in the pixels 14), and second portions 105b that overlap the black matrix 203 that is located in the boundary between two adjoining colored portions 202a. For example, in plan view of the display panel 10, the first portions 105a are formed in positions overlapping the red colored portions 202R, the green colored portions 202G, and the blue colored portions 202B (the openings in each pixel 14), and the second portions 105b are formed in position overlapping the black matrix 203 located in the boundary between the red colored portions 202R and the green colored portions 202G, and in positions overlapping the black matrix 203 located in the boundary between the green colored portions 202G and the blue colored portions 202B, and in positions overlapping the black matrix 203 located in the boundary between the blue colored portions 202B and the red colored portions 202R. The second portions 105b are formed in positions overlapping the data lines 11 in plan view of the display panel 10.

The thickness t2 of the second portions 105b is thicker than the thickness t1 of the first portions 105a (t2>t1). And the thickness t3 of the organic insulating film 105 (see FIG. 3) formed near the regions where the data lines 11 and the gate lines 12 cross each other is substantially the same as the thickness t1 of the first portions 105a (t3≈t1). In this way, the organic insulating film 105 has different film thicknesses depending on location. The thickness of the organic insulation film 105 can be made to differ according to location by, for example, changing exposure amount according to a position in a process of forming the organic insulating film 105 (so-called halftone exposure), or by providing a step by means of etching a layer formed on a base layer after the base layer has been formed, or by other such methods. A detailed method of manufacturing the organic insulating film 105 by halftone exposure will be described later.

The common electrode 20 is formed on the organic insulating film 105, and the common wiring 21 is formed on the common electrode 20. And the upper layer insulating film 106 is formed covering the common electrode 20 and the common wiring 21. The stripe-shaped pixel electrodes 15 are formed on the upper layer insulating film 106.

According to the above configuration, the thickness of the liquid crystal layer 300 (hereinafter referred to as a cell gap) located in the boundary between adjacent colored portions 202 can be smaller than the cell gap in the opening of the pixels 14. This makes it possible to control to a minimum variation in the polarization state of light transmitting obliquely through the liquid crystal layer 300 located in the boundary between adjacent colored portions 202. That light can be easily blocked by the polarizing plate on the CF substrate 200 side. As a result, color mixing can be reduced when the display screen is viewed from an oblique direction. Also, in the above-described configuration, since it is not necessary to widen the width of the black matrix 203 as in the conventional manner, the aperture ratio does not decrease. Furthermore, in the aforementioned configuration, the cell gap can be reduced by taking advantage of conventional components (organic insulating film, for example). Since it is not necessary to add new components, increase in product cost can also be kept under control.

Next, a process of manufacturing the liquid crystal display device 1 will be described. Because the CF substrate 200 can be manufactured by known techniques, explanation thereof is omitted. Here, a manufacturing process of the TFT substrate 100 will be described. The method of manufacturing the liquid crystal display device 1 according to the present embodiment includes, for example, first to sixth photolithography steps.

In the first photoetching step, a metal material is deposited on the glass substrate 101 by sputtering and is patterned. As a result, a planar pattern of the gate lines 12 and the gate electrodes 102 is formed. The metal material is, for example, a multilayer film of copper (Cu) layer with a thickness of 100 to 300 nm, and a molybdenum Mo layer deposited thereon.

In a second photoetching step, by chemical vapor deposition (CVD) process so as to cover the gate lines 12, the gate insulating film 103 of silicon nitride SiN and the semiconductor layer 18 made of amorphous silicon a-Si are deposited on the gate insulating film 103. Further, on the semiconductor layer 18, a laminated film of molybdenum (Mo) and copper (Cu) is formed by sputtering. Subsequently, the data lines 11, the drain electrodes 16 and the source electrodes 17 are formed utilizing halftone exposure at one step. The material of the metal wiring is the same as the material of the gate lines 12. Next, an interlayer insulating film 104 of silicon nitride SiN is laminated by a chemical vapor deposition (CVD) process such as to cover the data lines 11, the drain electrodes 16, and the source electrodes 17.

Figure 5A:
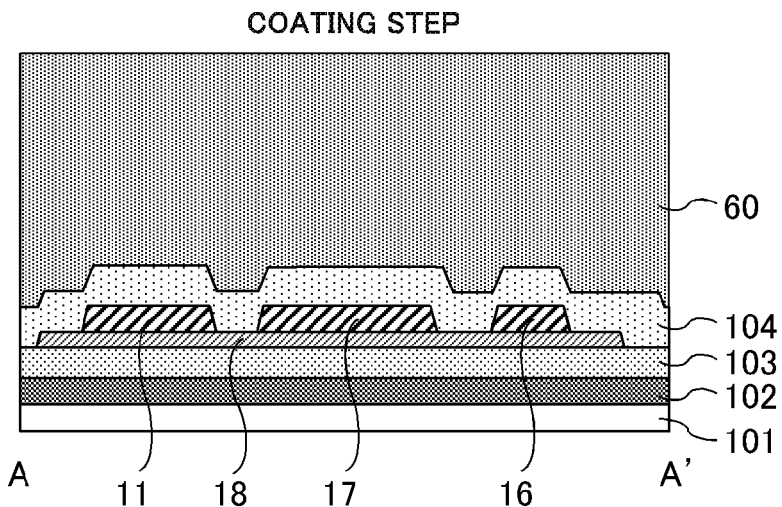
FIGS. 5A-5C are diagrams showing a part of a process of manufacturing an organic insulating film in the liquid crystal display device according to the present embodiment.
Figure 5B:
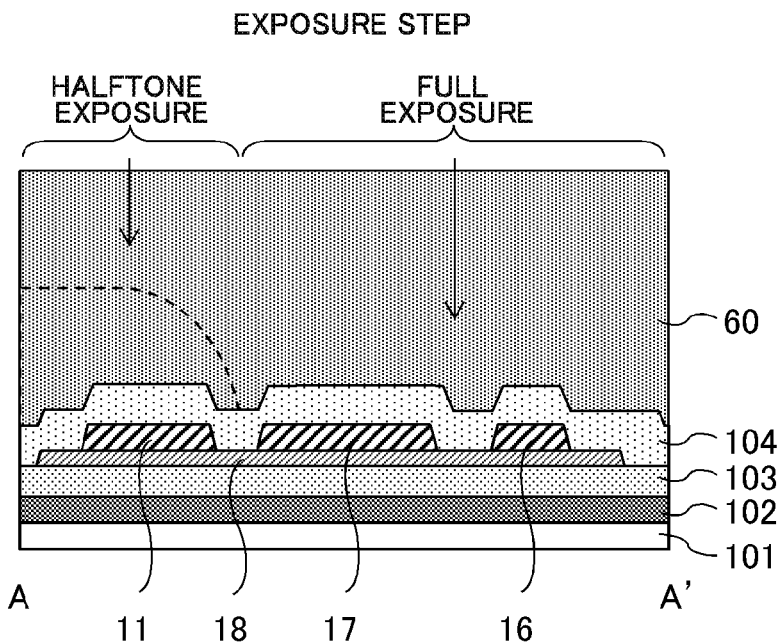
Figure 5C:
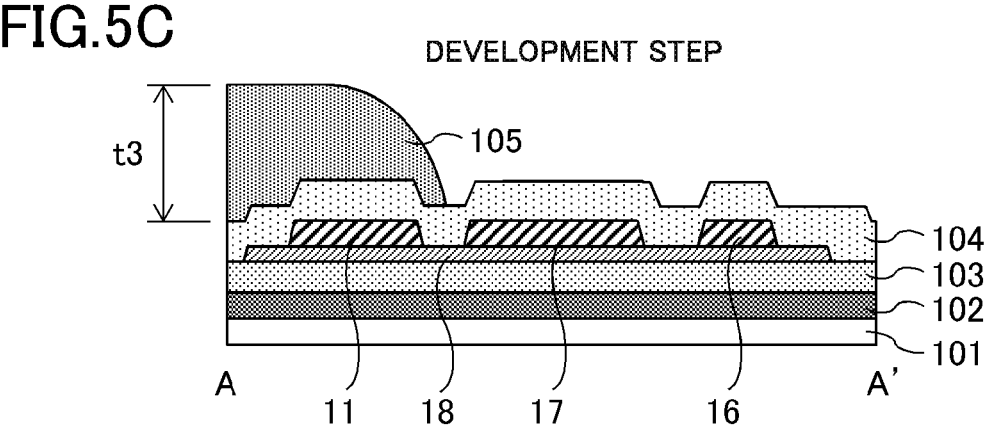
Figure 6A:
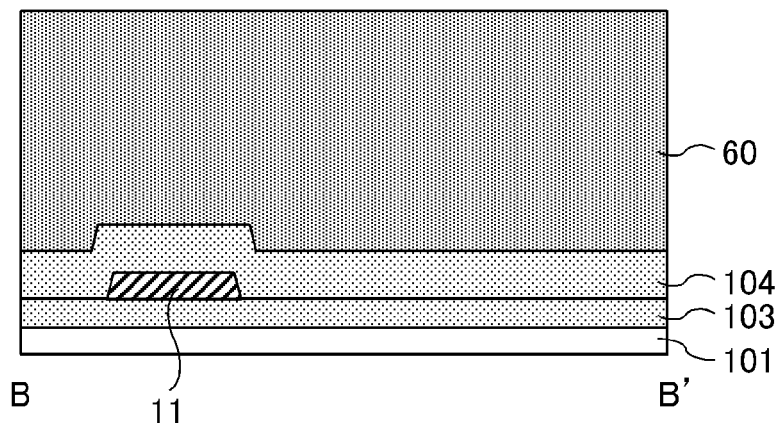
FIGS. 6A-6C are diagrams showing a part of a process of manufacturing of the organic insulating film in the liquid crystal display device according to the present embodiment.
Figure 6B:
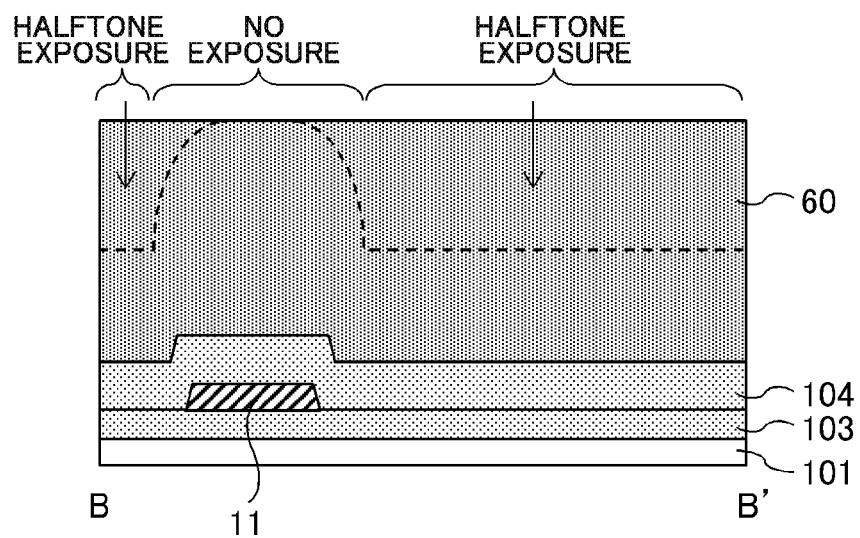
Figure 6C:
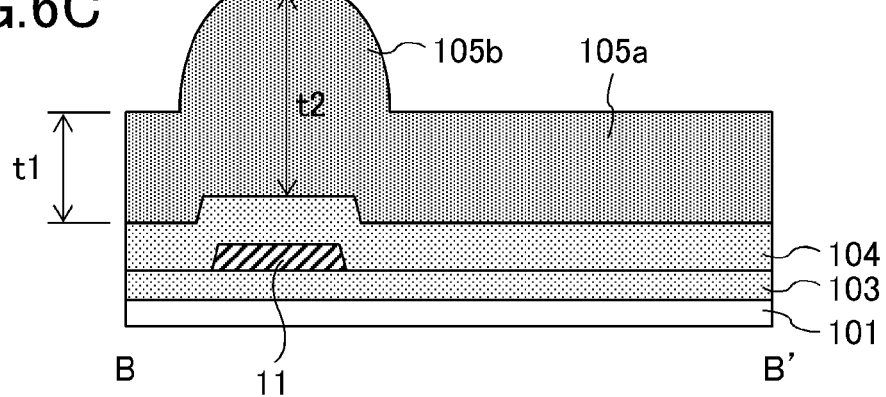

In a third photoetching step, on the interlayer insulating film 104, the organic insulating film 105 is formed utilizing halftone exposure. FIGS. 5A, 5B, and 5C are diagrams showing steps of forming the organic insulating film 105 in a region that includes a TFT. FIGS. 6A, 6B and 6C are diagrams showing steps of forming the organic insulating film 105 in the opening region of the pixels 14. The steps of forming the organic insulating film 105 include mainly a coating step, an exposure step, and an etching step.

As shown in FIG. 5 and FIG. 6, in the coating step, an organic material 60 of positive-type photosensitive acrylic is coated on the interlayer insulating film 104. Next, in the exposure step, the organic material 60 is exposed utilizing halftone exposure so that the thickness t2 of the second portion 105b is thicker than the thickness t1 of the first portion 105a. For example, the exposure amount is set to 0 (no exposure) for the organic material 60 in a region corresponding to the boundary between two adjoining colored portions 202 and, the exposure amount is set at 1 (full exposure) for the organic material 60 in the regions corresponding to the TFT 13 formation areas, and the exposure amount is set to ½ (half-exposure) for the organic material 60 in the regions corresponding to the opening areas of the pixels 14. Finally, in the development step the organic insulating film 105 is formed by removing the exposed portions of the organic material 60. In these processes, the organic insulating film 105 composed of the first portions 105a with the film thickness t1 and the second portions 105b with the film thickness t2 can be formed. As the organic insulating film 105, an organic material 60 of a photosensitive-negative type may be used. In this case, the exposure amount is set to 1 (full exposure) for the organic material 60 in regions corresponding to the boundary between two adjoining colored portions 202, and the exposure amount is set to 0 (no exposure) for the organic material 60 in the regions corresponding to the TFT 13 formation areas.

In a fourth photoetching step, on the organic insulation film 105, indium tin oxide (ITO) is formed into a film, and the common electrode 20 is shaped by photoetching.

In a fifth photoetching step, on the common electrode 20, the common wiring 21 made of metal material is formed.

In a sixth photoetching step, the upper layer insulating film 106 is formed by a chemical vapor deposition (CVD) process such as to cover the common electrode 20 and the common wiring 2. Further, the contact holes 19 are formed by dry etching the interlayer insulating film 104 and the upper layer insulating film 106, so as to reach the source electrode 17.

In a seventh photoetching step, a film of indium tin oxide (ITO) being a transparent electrode material is formed by sputtering on the upper layer insulating film 106 and inside the contact holes 19. And the pixel electrodes 15 are formed by photoetching. The pixel electrodes 15 are patterned to form slits. A portion of the pixel electrodes 15 is formed directly on the source electrodes 17. Thereby, the pixel electrodes 15 and the source electrodes 17 are electrically connected to each other.

Through the aforementioned steps, a TFT substrate 100 of the liquid crystal display device 1 is manufactured.

Figure 7:
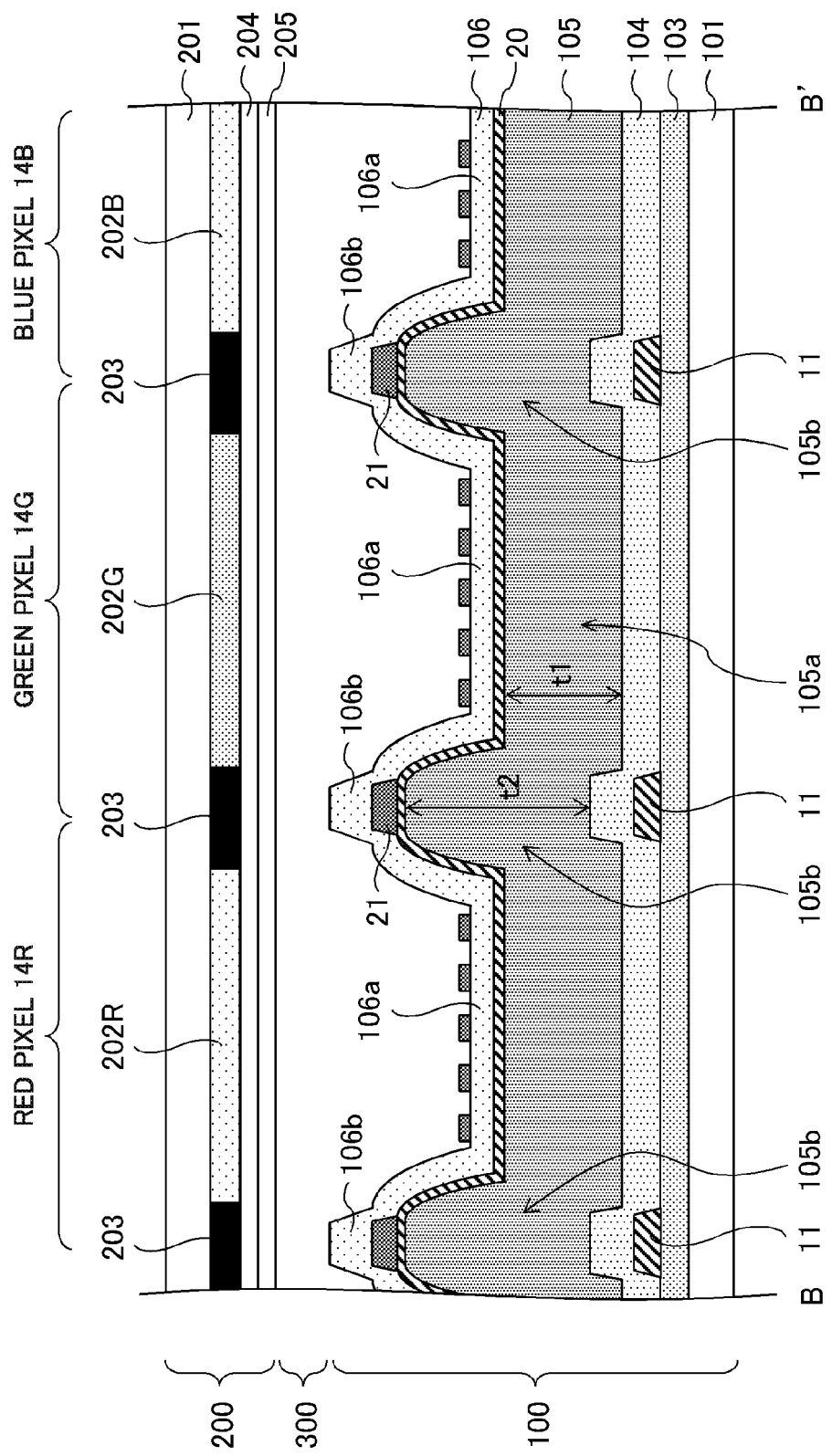
FIG. 7 is a sectional view taken along line B-B' in FIG. 2, showing another configuration of the display panel according to the present embodiment.

The configuration of the liquid crystal display device 1 is not limited to the above configuration. More specifically, the configuration that the cell gap located in the boundary between adjoining colored portions 202 is smaller than the cell gap at the opening areas in the pixels 14 is not limited to the above configuration. For example, as shown in FIG. 7, the upper layer insulating film 106 may include a first portion 106a that overlaps the colored portions 202 (opening areas of the pixels 14) and a second portion 106b that overlaps the black matrix 203 positioned in boundary between two adjoining colored portions 202 in plan view of the display panel 10. More specifically, in plan view of the display panel 10, the first portions 106a are formed in regions overlapping the red colored portions 202R, the green colored portions 202G, and the blue colored portions 202B (opening areas of the pixels 14), second portions 106b are formed in a position overlapping the black matrix 203 located in the boundary between the red colored portions 202R and the green colored portions 202G, in a position overlapping the black matrix 203 located in the boundary between the green colored portions 202G and the blue colored portions 202B, and in the position overlapping the black matrix 203 located in the boundary between the blue colored portions 202B and the red colored portions 202R. The second portion 106b is further formed in a position overlapping the data lines 11 in plan view of the display panel 10. And the film thickness of the second portion 106b is thicker than the film thickness of the first portion 106a. According to the above configuration, the cell gaps located in the boundary between adjacent colored portions 202 can be even smaller than the cell gaps in the positions corresponding to the opening areas in the pixels 14.

A method of manufacturing the upper layer insulating film 106 shown in FIG. 7 will be described with reference to FIGS. 8 to 11.

Figure 8A:
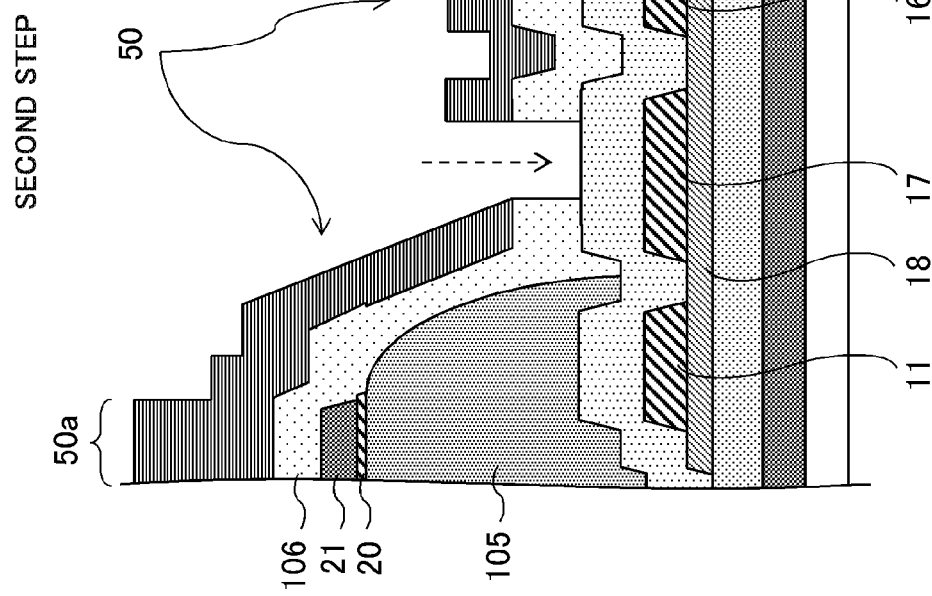
FIGS. 8A and 8B are diagrams showing a part of a process of manufacturing an upper insulating film in the liquid crystal display device according to the present embodiment.

In a first step, a positive-type resist 50 is coated on the upper layer insulating film 106 (referring to FIG. 8A). Next, in an exposure step, utilizing halftone exposure, the resist 50 is exposed so that the film thickness in regions 50a overlapping the black matrix 203 located in the boundary between adjacent colored portions 202 is thicker than the film thickness of the areas overlapping the colored portions 202 (opening areas in the pixels 14).

For example, the exposure amount is set to 0 (no exposure) for the resist 50 in the regions 50a overlapping the black matrix 203 located in a boundary between two adjoining colored portions 202, and the exposure amount is set to 1 (full exposure) for the resist 50 in regions corresponding to the source electrodes 17 of the TFTs 13, and the exposure amount is set to ½ (half-exposure) for the resist 50 in the regions corresponding to the opening areas in the pixels 14. Finally, in the development step, a resist 50 that differs in film thickness is formed by removing surplus resist. Openings are formed in the resist 50 above the source electrodes 17. As the resist 50, a negative-type photosensitive resin may be used. In this case, the exposure amount is set to 1 (full exposure) for the resist 50 in regions corresponding to boundary between two adjoining colored portions 202, and the exposure amount is set to 0 (no exposure) for the resist 50 in regions corresponding to the source electrodes 17 of the TFT 13.

Figure 8B:
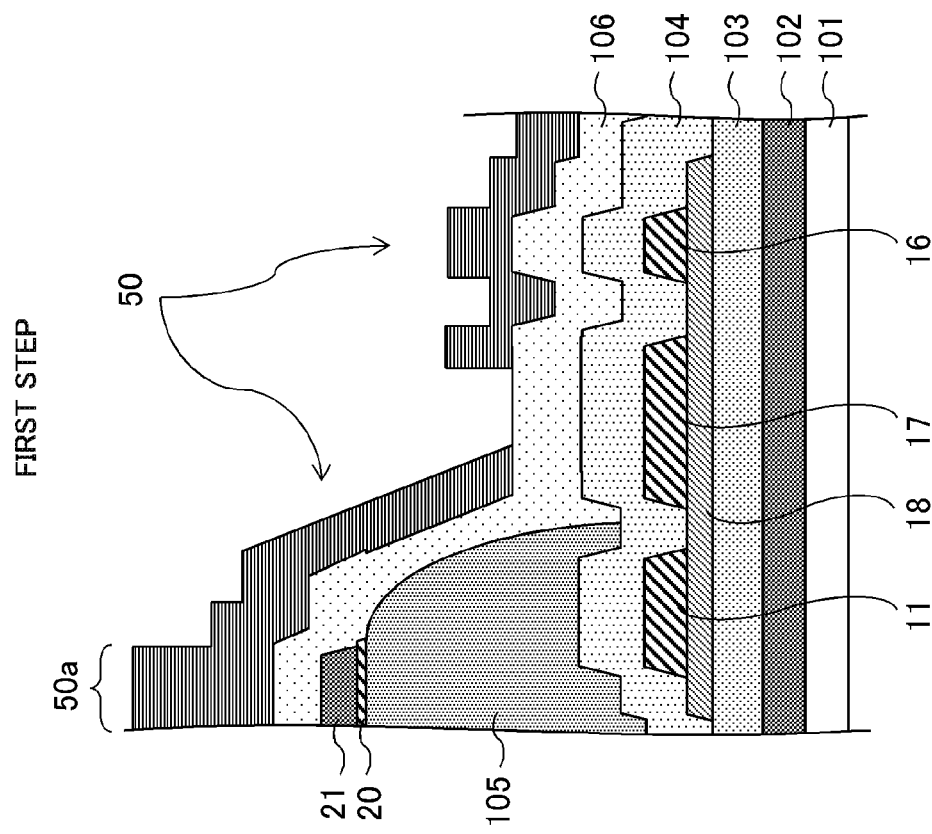

In a second step, with the aforementioned resist 50 patterned in the first step, the upper layer insulating film 106 that is exposed through the openings, the interlayer insulating film 104 depending on the situation, is dry-etched (referring to FIG. 8B). Here, the thickness of the insulating film to be residual is set to be substantially the same thickness as the thickness of the upper layer insulating film 106 that is dry-etched in a fourth step described below.

In a third step, a part of the resist 50 is removed by ashing (see FIG. 9A). As a result, the resist 50 in the region except the regions 50a overlapping the black matrix 203 located in the boundary between adjacent colored portions 202 is removed.

In a fourth step, with the resist 50 in the region 50a, the upper layer insulating film 106, and the interlayer insulating film 104 which is exposed through the openings are dry-etched (see FIG. 9B). Thus, the source electrode 17 is exposed, and the contact holes 19 are formed.

In a fifth step, the resist 50 in the regions 50a is removed. As a result, the upper layer insulating film 106 is formed so that the thickness in the regions 50a overlapping the black matrix 203 located in the boundary between adjacent colored portions 202 is thicker than the thickness of the areas overlapping the colored portions 202.

Although in the above etching steps dry-etching is used, wet-etching may be used. In the above description, methods of forming an upper layer insulating film 106 of differing thickness are described. By similar methods, it is possible to provide film thickness differences in the gate insulating film 103 or the interlayer insulating film 104.

In the configuration shown in FIG. 7, the film thickness of the organic insulation film 105 may be substantially uniform (t1≈t2≈t3).

Further, the liquid crystal display device 1 need not include the organic insulating film 105. In this case, as shown in FIG. 7, the upper layer insulating film 106 may have a thicker film thickness in the regions 50a. Although not shown, the gate insulating film 103 may have thicker film areas, similar to the upper layer insulating film 106.

The method of forming the upper layer insulating film 106 is not limited to the above method. Hereinafter, another method of forming the upper layer insulating film 106 will be described with reference to FIGS. 12 to 14. In the following description, description regarding the same steps as the forming steps shown in FIGS. 8 to 10 will be omitted.

Figure 12A:
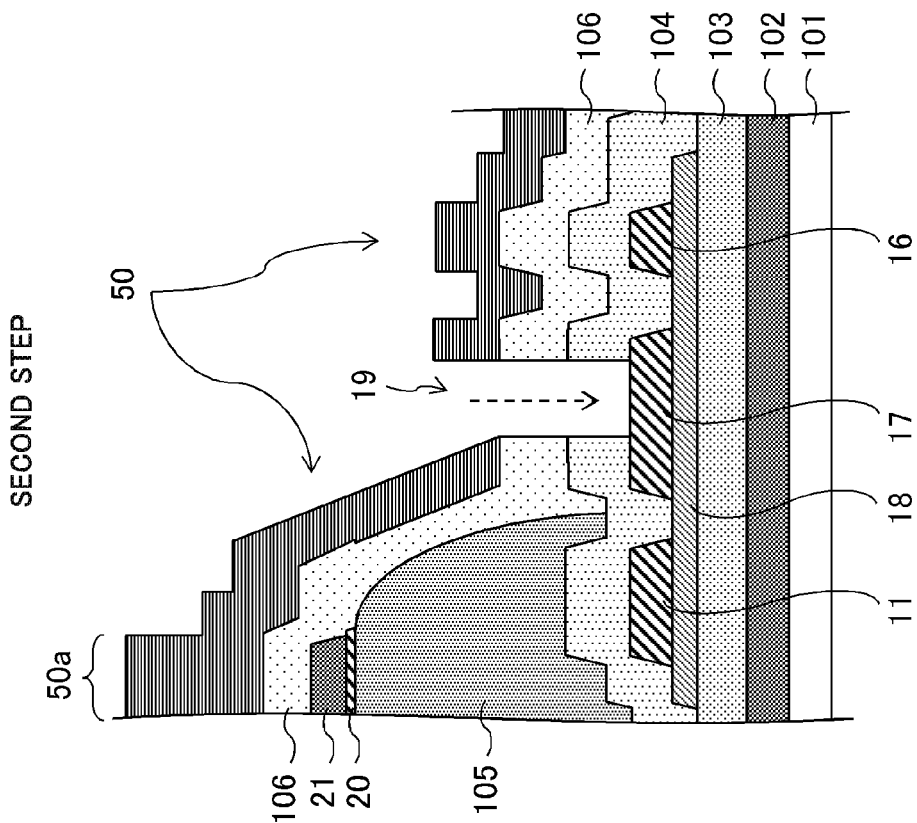
FIGS. 12A and 12B are diagrams showing a part of a process of manufacturing the upper insulating film in the liquid crystal display device according to the present embodiment.

A first step is the same as the first step shown in FIG. 8A (refer to FIG. 12A). In the first step, a resist 50 of partially differing film thickness is formed so that it is opened in regions located above the source electrodes 17.

Figure 12B:
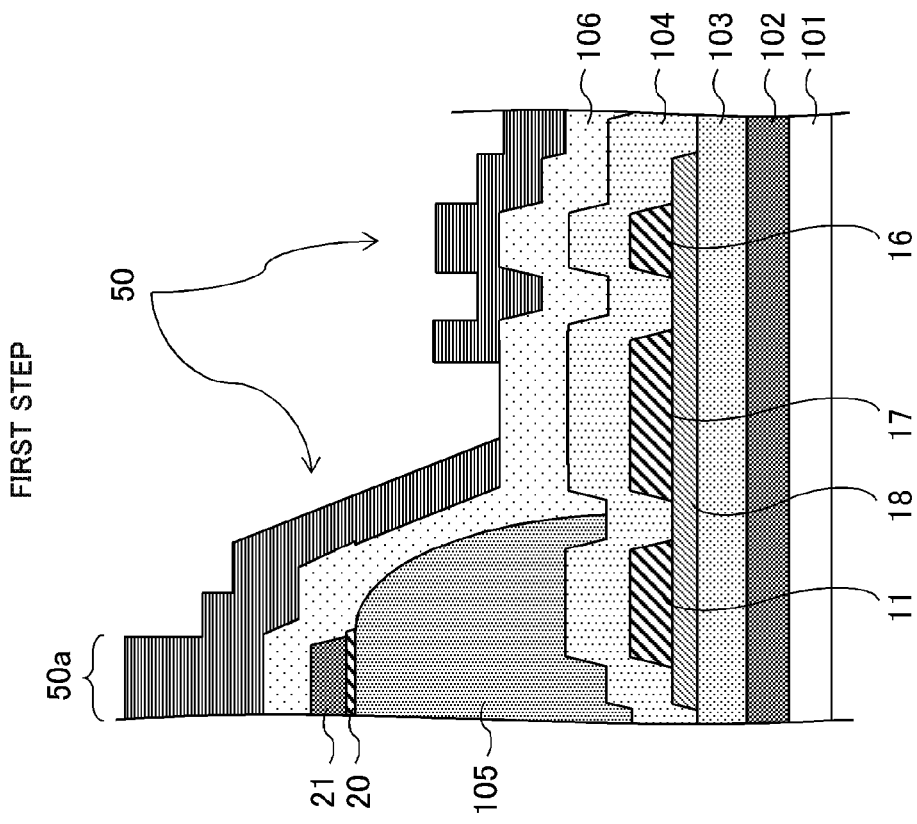

In a second step, with the resist 50 formed in the first step, the upper layer insulating film 106 and the interlayer insulating film 104 positioned below the regions where the openings have been formed are subject to dry-etching until the source electrodes 17 are exposed (refer to FIG. 12B). Thus, the source electrodes 17 are exposed, and the contact holes 19 are formed.

A third step is the same as the third step shown in FIG. 9A (referring to FIG. 13A). In the third step, the resist 50 in the regions except for the regions 50a overlapping the black matrix 203 located at the boundary between adjacent colored portions 202 is removed.

In the fourth step, with the resist 50 in the regions 50a, the upper layer insulating film 106 is subjected to dry-etching to a desired film thickness (referring to FIG. 13B).

Figure 10:
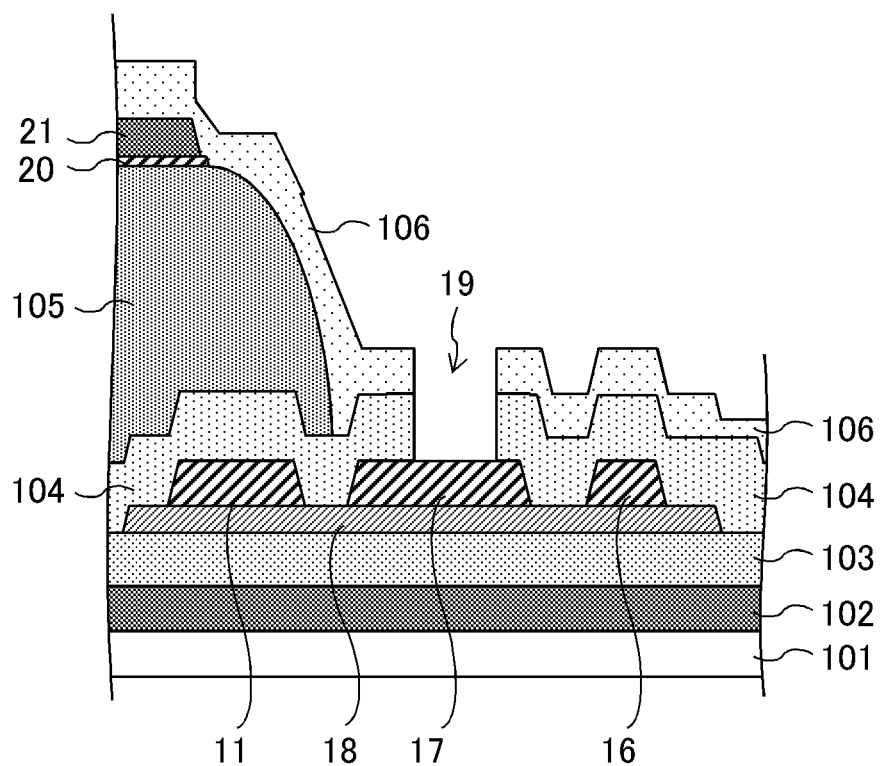
FIG. 10 is a diagram showing a part of a process of manufacturing the upper insulating film in the liquid crystal display device according to the present embodiment.
Figure 14:
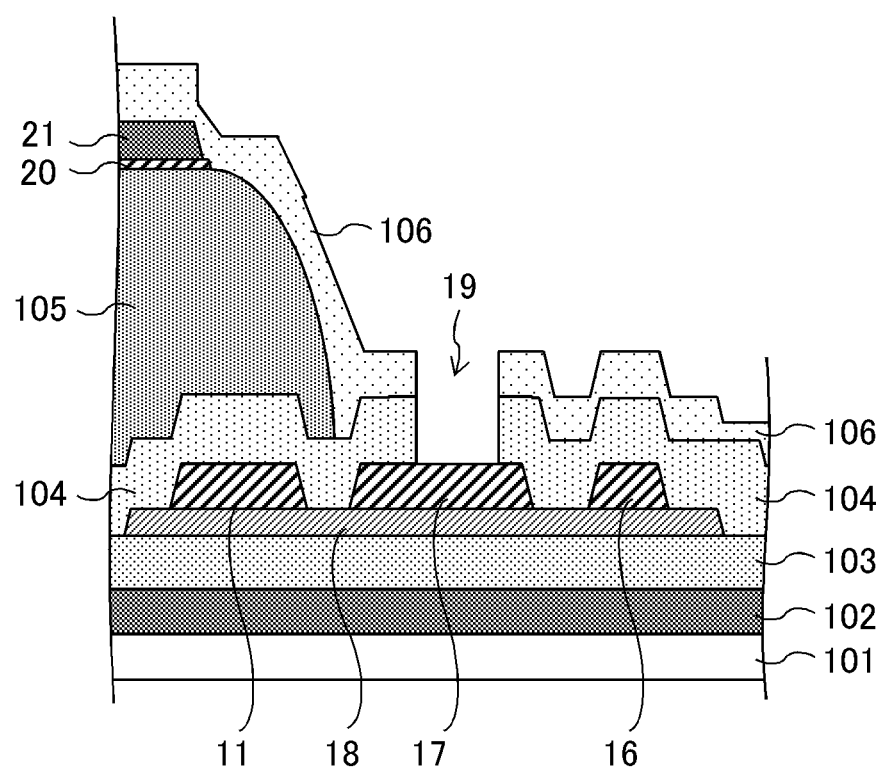
FIG. 14 is a diagram showing a part of a process of manufacturing the upper insulating film in the liquid crystal display device according to the present embodiment.

A fifth step is the same as the fifth step shown in FIG. 10 (referring to FIG. 14). In the fifth step, the upper layer insulating film 106 in which the film thickness in the regions 50a overlapping the black matrix 203 located at the boundary between adjacent colored sections 202 is thicker than the film thickness in the regions overlapping each colored section 202 is formed.

Figure 11:
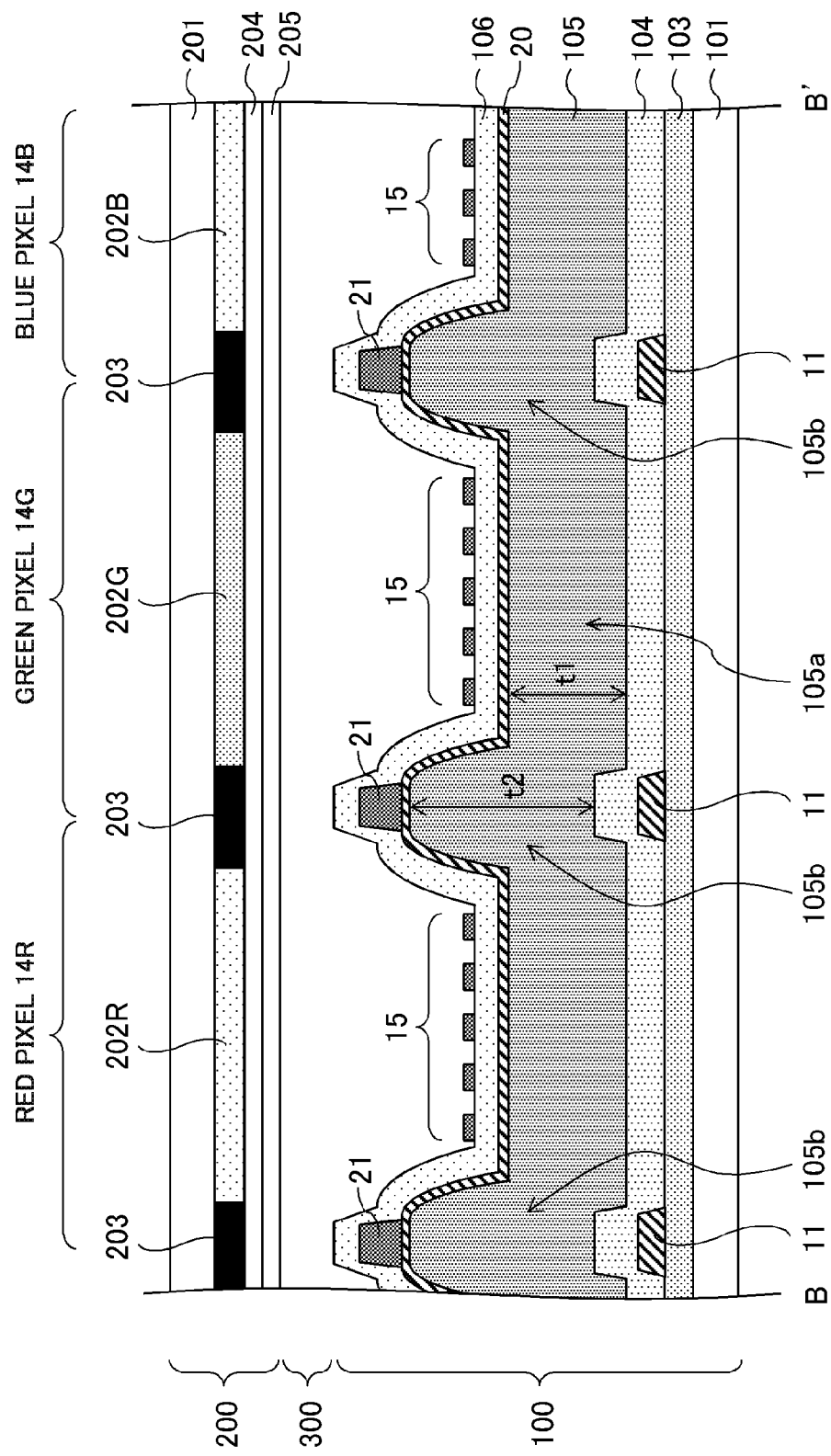
FIG. 11 is a sectional view taken along line B-B' in FIG. 2, showing another configuration of the display panel according to the present embodiment.

As described above, in the liquid crystal display device 1, the insulating film overlaps the gate lines 12, the data lines 11, and the pixel electrodes 15 in plan view. The insulating film includes the first portions overlapping, in plan view, the first colored sections 202 that transmit light of a first color or the second colored sections 202 that transmit light of a second color, and the second portions overlapping, in plan view, the black matrix 203. The second portions are of thicker film thickness than the first portions. In the above configuration, as shown in FIG. 11, the film thickness of the common wiring 21 may be made thicker. In this way, in the present embodiments, with conventional components constituting a liquid crystal display device 1, the cell gap in the boundary between adjacent colored sections 202 is smaller than the cell gap of the openings in the pixels 14.

Furthermore, the pixel configuration of the liquid crystal display device 1 described above is structured in an in-plane switching (IPS) scheme, but is not limited thereto. For example, the common electrode 20 may be formed on the CF substrate 200. Further, in the liquid crystal display device 1 described above, the common electrode 20 is arranged in the lower layer, and the pixel electrodes 15 are arranged in the upper layer. However, the pixel electrodes 15 may be arranged in the upper layer and the common electrode 20 may be arranged in the upper layer.

Further, in the liquid crystal display device 1 described above, the colored sections 202 include the red colored sections 202R, the green colored sections 202G, and the blue colored sections 202B, but not being limited thereto, may include other colored sections that transmit colors other than red, green and blue.

Although exemplary embodiments of the present disclosure are described above, the present disclosure is not limited to these exemplary embodiments. It is noted that other embodiments properly changed from the exemplary embodiments described above by those skilled in the art without departing from the scope of the present disclosure are fully supported by the present disclosure.

What is claimed is:

1. A liquid crystal display device comprising:
  a first substrate and a second substrate disposed in opposition; wherein
  the first substrate includes
    a plurality of gate lines, a plurality of data lines, a plurality of pixel electrodes, and an insulating film being superimposed, in plan view, over the plurality of gate lines, the plurality of data lines, and the plurality of pixel electrodes;
  the second substrate includes
    a first colored portion transmitting light of a first color, a second colored portion transmitting light of a second color, and a light-shielding portion disposed in a boundary area between the first colored portion and the second colored portion, for blocking transmittance of light of the first color and light of the second color; and
  the insulating film includes
    a first portion overlapping, in plan view, the first colored portion or the second colored portion, and
    a second portion overlapping, in plan view, the light-shielding portion and being of thicker film thickness than the first portion.

2. The liquid crystal display device of claim 1, wherein the insulating film is an organic insulating film.

3. The liquid crystal display device of claim 1, wherein:
  the first substrate further includes a common electrode; and
  the insulating film is disposed between the common electrode and the plurality of pixel electrodes.

4. A method of manufacturing a liquid crystal display device including a first substrate including a plurality of gate lines, a plurality of data lines, a plurality of pixel electrodes, and an organic insulating film, made of an organic material, being superimposed, in plan view, over the plurality of gate lines, the plurality of data lines, and the plurality of pixel electrodes, and a second substrate including a first colored portion transmitting light of a first color, a second colored portion transmitting light of a second color, and a light-shielding portion disposed in a boundary area between the first colored portion and the second colored portion, for blocking transmittance of light of the first color and light of the second color, the liquid-crystal display device manufacturing method comprising:
  a process of forming the organic insulating film, including
    a step of forming an organic layer by coating an organic photosensitive material onto the first substrate, and
    a step of irradiating the organic layer with light beams of differing amount of light onto a first portion of the organic layer overlapping, in plan view, the first colored portion or the second colored portion, and onto a second portion of the organic layer overlapping, in plan view, the light-shielding portion;
  wherein
  in the step of forming the organic insulating film, the second portion is formed to be of thicker layer thickness than the first portion.

5. The liquid-crystal display device manufacturing method of claim 4, wherein:
  the liquid crystal display device further comprises a thin film transistor; and
  in the step of irradiating the organic layer with light beams, a third portion of the organic layer being superimposed, in plan view, over the thin film transistor is irradiated with a light beam of amount of light different from that of the first portion and the second portion, to remove the third portion of the organic layer.

6. The liquid-crystal display device manufacturing method of claim 4, wherein:
  the organic photosensitive material is a positive-type photosensitive synthetic resin; and in the step of irradiating the organic film with light beams, the amount of light that the first portion is irradiated with is greater compared with the amount of light that the second portion is.

7. The liquid-crystal display device manufacturing method of claim 6, wherein in the step of irradiating the organic film with light beams, the amount of light that the third portion of the organic film being superimposed, in plan view, over the thin film transistor is irradiated with is greater compared with the amount of light that the first portion is.

8. A method of manufacturing a liquid crystal display device including a first substrate including a plurality of gate lines, a plurality of data lines, a plurality of pixel electrodes, and an inorganic insulating film, made of an inorganic material, being superimposed, in plan view, over the plurality of gate lines, the plurality of data lines, and the plurality of pixel electrodes, and a second substrate including a first colored portion transmitting light of a first color, a second colored portion transmitting light of a second color, and a light-shielding portion disposed in a boundary area between the first colored portion and the second colored portion, for blocking transmittance of light of the first color and light of the second color, the liquid-crystal display device manufacturing method comprising:
 a process of forming the inorganic insulating film, including
  a step of forming an inorganic layer onto the first substrate,
  a step of forming a resist layer by coating an organic photosensitive material onto the inorganic layer, a step of irradiating the inorganic layer with light beams of differing amount of light onto a first region of the resist layer overlapping, in plan view, the first colored portion or the second colored portion, and onto a second region of the resist overlapping, in plan view, the light-shielding portion;
 a first resist removing step of removing the first region of the resist layer and leaving the second region of the resist layer;
 a first etching step of etching portions of a first part of the inorganic layer overlapping the first region in plan view; and
 a second resist removing step of removing the second region of the resist layer; wherein
 in the step of forming the inorganic layer, a second part of the inorganic layer overlapping the second region in plan view is formed to be of thicker film thickness than the first part of the inorganic layer.

9. The liquid-crystal display device manufacturing method of claim 8, wherein:
 the first substrate further includes a thin film transistor;
 in the step of irradiating the inorganic layer with light beams, a third region of the inorganic layer overlapping at least a part of the thin film transistor in plan view is irradiated with a light beam of amount of light different from that of the first region and the second region of the inorganic layer, to remove the resist layer; and
 the manufacturing method further comprises a second etching step of removing, by etching, a third part of the inorganic layer overlapping the third region in plan view.

10. The liquid-crystal display device manufacturing method of claim 8, wherein:
 the organic photosensitive material is a positive-type photosensitive synthetic resin; and
 in the step of irradiating the inorganic layer with light beams, the amount of light that the first region is irradiated with is greater compared with the amount of light that the second region is.

11. The liquid-crystal display device manufacturing method of claim 10, wherein in the step of irradiating the inorganic film with light beams, the amount of light that the third region overlapping at least a part of the thin film transistor in plan view is irradiated with is greater compared with the amount of light that the first part is.

* * * * *